March 24, 1936.  J. A. DRYDEN  2,034,801
ATTACHMENT FOR MOWING MACHINES
Filed Feb. 24, 1934   3 Sheets-Sheet 2
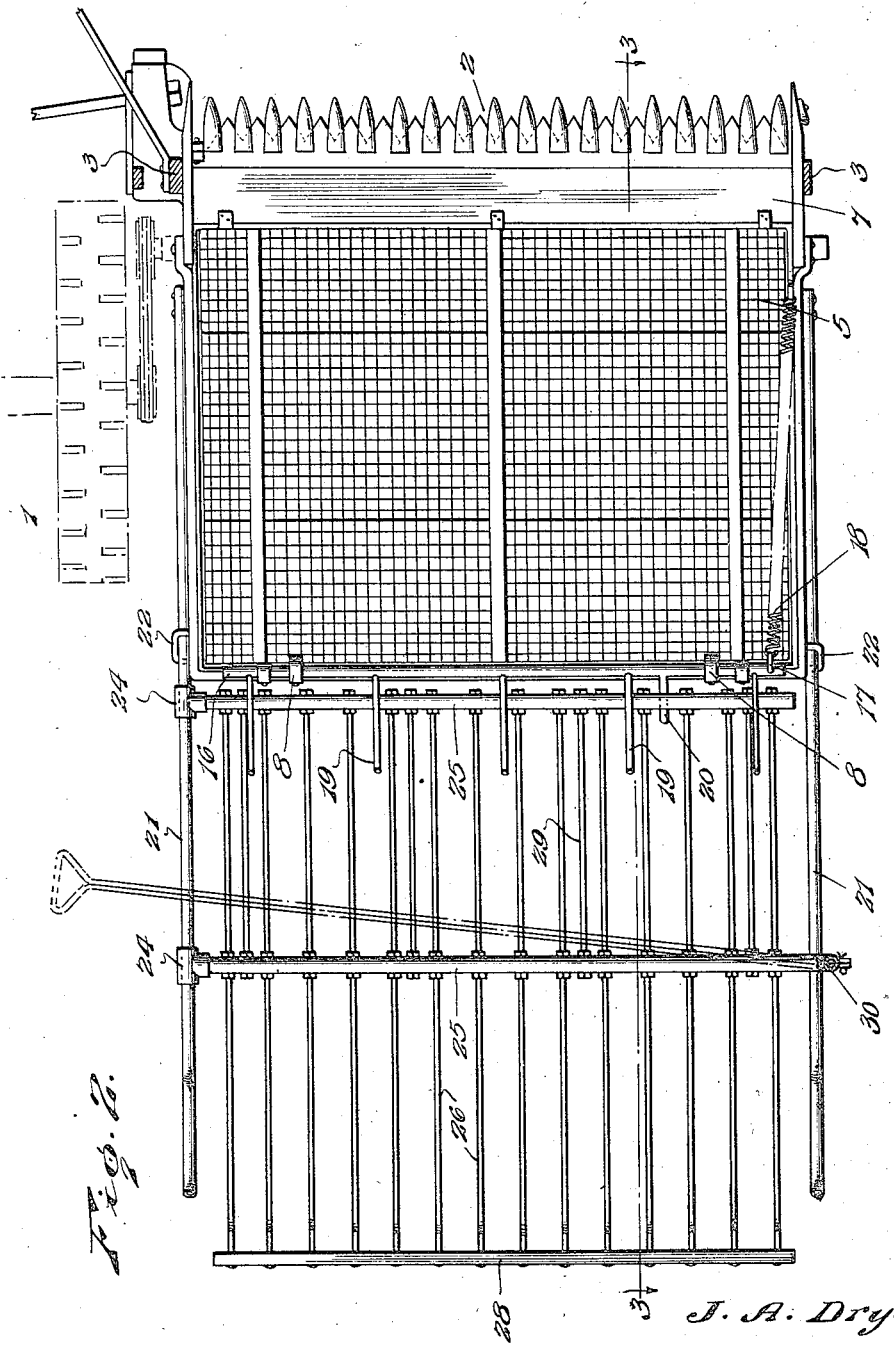

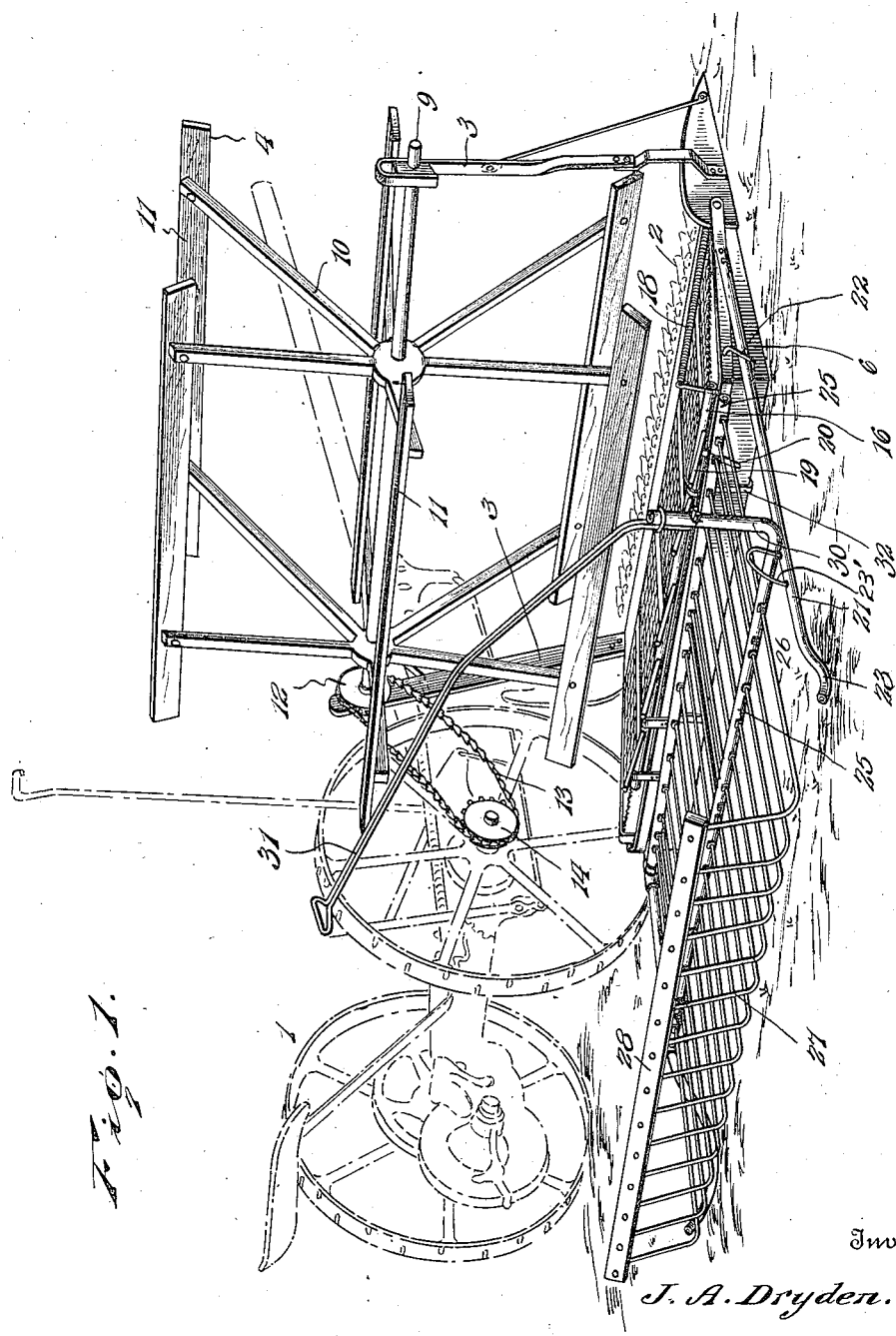

March 24, 1936. J. A. DRYDEN 2,034,801
ATTACHMENT FOR MOWING MACHINES
Filed Feb. 24, 1934 3 Sheets-Sheet 3
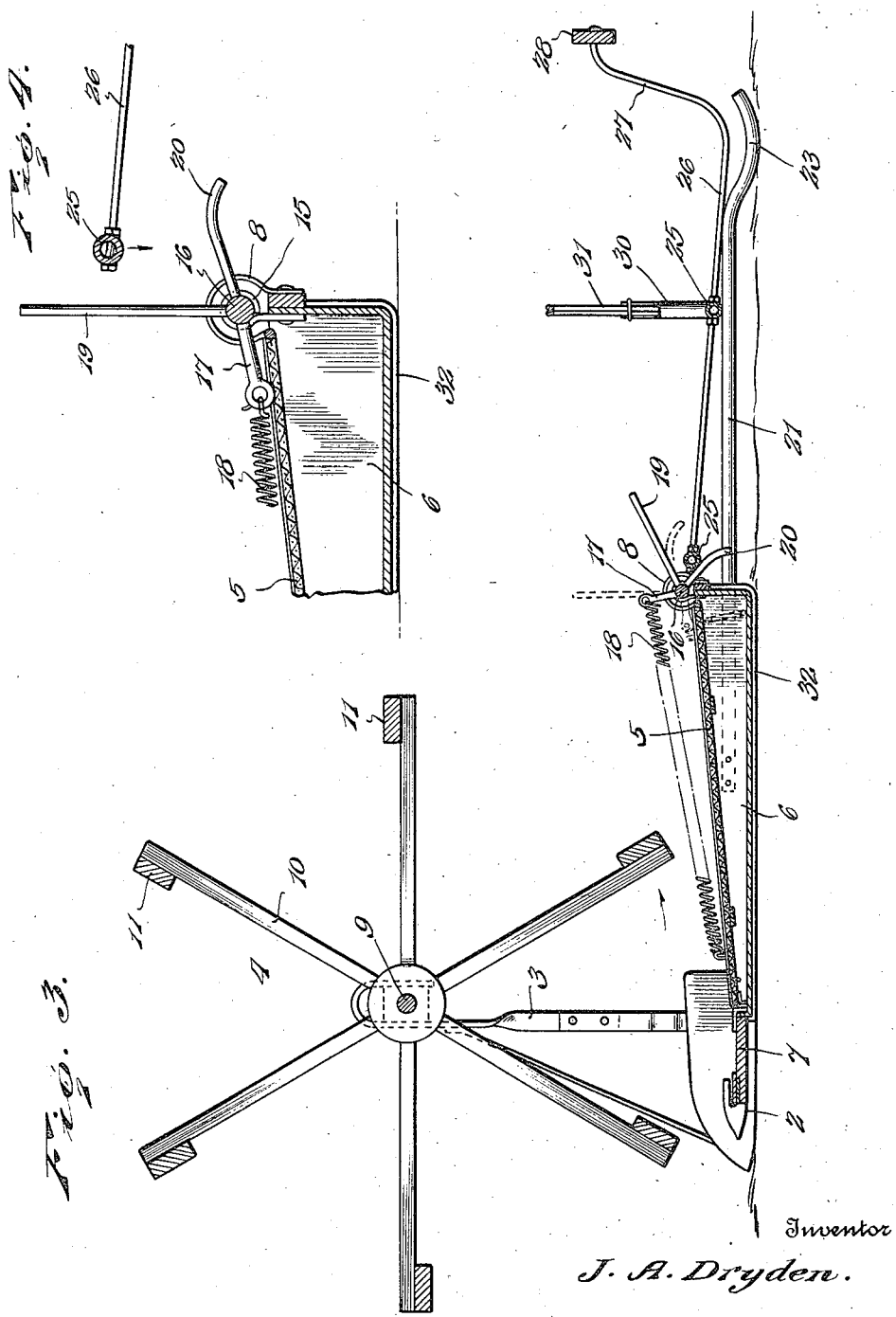
Inventor
J. A. Dryden.
By Lacey & Lacey, Attorneys Patented Mar. 24, 1936

2,034,801

UNITED STATES PATENT OFFICE 2,034,801

ATTACHMENT FOR MOWING MACHINES

James A. Dryden, Shelbyville, Tenn.

Application February 24, 1934, Serial No. 712,808

5 Claims. (Cl. 56—203)

This invention relates to harvesters and has for its primary object the provision of means whereby small seed, such as clover seed, which is ordinarily lost when a crop is mowed, may be saved. A further object of the invention is to provide means whereby, as a mower is drawn over a field, the grass or other crop may be continuously cut and collected at the rear of the means for saving seed and at intervals the collected grass may be dumped at the rear of the mower so that it will be out of the line of the next travel of the machine over the field. The invention also seeks to improve the construction of a seed saving attachment for mowers in order that simplicity and durability may be attained. The invention is illustrated in the accompanying drawings and consists in certain novel features which will be hereinafter first fully described and then more particularly defined in the appended claims.

In the accompanying drawings,

Figure 1 is a perspective view of an apparatus embodying the present invention.

Figure 2 is a plan view of the same.

Figure 3 is a longitudinal section.

Figure 4 is an enlarged detail section of a portion of the pan and the automatically operated retainer which is mounted on the pan.

The mower may be of any known or approved design and is indicated conventionally at 1. The mower includes the usual cutter 2 which is driven from the traction wheels of the mower in any known or approved manner and, in carrying out the present invention, there is provided at the ends of the mower standards or props 3 which support a reel 4 adapted to beat the cut crop rearwardly onto the screen 5 which is arranged over a pan 6 and will separate the seed from the cut grass or other crop so that the seed will be collected in the pan while the remaining portion of the crop may be caused to move rearwardly onto a buncher disposed at the rear of the pan. The pan is supported at its front edge, in any convenient manner, upon the finger bar 7 of the cutter and has upstanding end and rear walls, as will be understood upon reference to Figures 3 and 4. The screen 5 may rest at its front end upon the front edge of the pan and at its rear edge is hingedly or pivotally connected to brackets 8 which are secured upon the rear wall of the pan.

The reel 4 comprises a central shaft 9 with radial arms 10 secured to and extending therefrom, the outer ends of the corresponding spokes or radial arms being connected by blades 11 which will bear upon the cut grass or other crop immediately adjacent the cutter and will sweep or beat the same backwardly over the pan. A sprocket wheel 12 is secured upon the shaft 9 immediately adjacent the mowing machine and is connected by a chain 13 with a similar sprocket 14 secured upon the adjacent traction wheel of the mower, as clearly shown in Figure 1, whereby the reel will be rotated as the mower is drawn over the field.

Mounted in suitable bearing supports 15 upon the upper edge of the rear wall of the pan is a rock shaft 16 which extends from end to end of the pan and is provided at its outer end with a normally upstanding crank arm 17 to which is attached the rear end of a contractile spring 18, the front end of which is secured to the front edge of the screen or to some adjacent fixed part. Normally extending rearwardly from the rock shaft 16 are a series of fingers 19 which extend normally rearwardly from the shaft and project over the front end of the collector or buncher. There is also a trip finger 20 projecting from the rock shaft 16 and this finger 20 normally lies under the front edge of the buncher, as shown in Figure 3.

Pivoted at their front ends upon the respective sides or ends of the pan are runners 21 which are supported between their ends somewhat loosely in clips or similar guides 22 provided on the ends of the pan adjacent the rear wall thereof and the rear ends of these runners are turned downwardly, as indicated at 23, so that they may ride easily upon the ground as the machine is drawn over the field and will readily clear small obstructions. Fitted on the runners near their free ends are stops 23'. Fitted upon the runner 21 which is adjacent the mower, are sleeves 24 which may rock about the runner and carry transverse rods or bars 25 which extend transversely of the machine at the rear of the pan. Parallel rods 26 are secured at their front ends to the front rod or bar 25 and extend rearwardly therefrom through the rear bar 25, as clearly shown in Figure 2, the rear ends of the rods 26 being turned upwardly, as shown at 27 in Figures 1 and 3, whereby they will form a basket or retainer to catch and hold the cut grass or other crop which may be fed onto them from the screen 5. The extremities of the rods 26 are connected by a rigid bar 28 so as to retain the formation of the device and the rods preferably pass through the bars 25 and are rigidly secured therein by nuts mounted on the rods and turned home against the bars. Between the two bars 25 additional rods 29 are preferably inserted so as to impart additional rigidity to the structure and more effectually retain the load thereon. The forward bar 25, at the right side of the machine, terminates in spaced relation to the adjacent runner 21, while the rear bar 25 has its extremity turned upwardly, as shown at 30, and rests on the runner, a handle bar 31 being fixed in any approved manner to the upper extremity of this terminal 30 and extending therefrom to a point where it may be conveniently manipulated by the driver upon the seat of the mower.

Preferably, reinforcing straps 32 are secured to the bottom and rear wall of the pan, as shown most clearly in Figures 3 and 4 and these straps serve as runners to support the pan as it is drawn over the field and also minimize the wear upon the bottom of the pan.

From the foregoing description, taken in connection with the accompanying drawings, it is thought that the operation and advantages of my attachment will be readily understood and appreciated. As the machine is drawn over the field, the reel is obviously rotated so that its blades pass successively above the cutter and adjacent thereto and will beat the upstanding crop over so that it will be effectually engaged by the cutter and, as it is mowed, will be caused to drop onto the screen 5, the seed, which is carried with the crop and is ordinarily scattered over the field, being caused to pass through the screen and collect in the pan. The buncher rods 26 will normally be in the position illustrated in the drawings with their rear ends riding on the ground or supported near the surface thereof and the mowed crop will be forced over onto the buncher and held thereon. In the normal position of the parts, the front edge of the buncher bears upon the trip finger 20, as shown in Figure 3, so that the retaining fingers 19 will project over the buncher against the tension of the spring 18. When a sufficient quantity of the crop has been gathered in the buncher to form a shock, the driver will pull upon the handle bar 31 and will thereby rock the buncher laterally, with the sleeves 24 as a center, and the gathered crop will be consequently dropped immediately behind the mower. When the buncher is thus rocked transversely, the front bar 25 will impinge against fingers 19 and swing them upwardly to the position shown by dotted lines in Figure 3 and in full lines in Figure 4, in which position they will be held by the spring 18 so that the crop which may be cut while the buncher is in the raised position will be held on the pan. When the buncher is released and resumes its normal position, the front bar 25 thereof will again impinge against the trip finger 20 and will thereby rock the shaft 16 so as to return the parts to normal position, as shown in Figure 3, whereupon the accumulated material which has been temporarily held over the pan by the fingers 19 will be permitted to pass onto the buncher.

It will thus be seen that I have provided a very simple and efficient mechanism whereby the seed which is ordinarily lost when harvesting clover and similar crops will be saved and the crop may be delivered at the rear of the mower at suitable intervals. The mechanism is free of complicated arrangements so that it is not apt to get out of order and it will operate in a highly efficient manner.

After the crop has been harvested, the screen 5 may be swung about its hinge connection with the brackets 8 so that access to the pan may be had and the gathered seed removed from the pan and stored or otherwise disposed of in any desired manner.

Having thus described the invention, I claim:

1. An attachment for mowers having a pan and comprising runners pivotally connected to said pan, a buncher comprising transverse spaced rods hingedly mounted on one of the runners, said buncher having a rear rod secured at one end thereto and having a free end extended to rest upon the other runner, and means connected with the last mentioned rod for transversely rocking the buncher.

2. An attachment for mowers having a pan and comprising a rock shaft mounted on said pan, fingers projecting substantially upwardly from the rock shaft, yieldable means connecting the rock shaft with the forepart of the mower for holding said rock shaft and said fingers in position to arrest travel of a crop, and a buncher mounted on the mower to rock transversely of the line of travel of the crop, said buncher being adapted to form shocks from the crop passing therethrough.

3. An attachment for mowers having a pan and comprising a rock shaft mounted on said pan, fingers projecting substantially upwardly from said rock shaft, a crank at one end of the rock shaft, a trip finger carried by the rock shaft, a spring having one end connected to the crank and the other end to a fixed element on the mower for resiliently connecting said crank and element, and a rockable buncher connected with the pan at one side rearwardly of the rock shaft and having a front end portion disposed between the first mentioned fingers, said buncher being arranged to rock transversely of the line of travel for discharging a gathered load at the rear of the mower and said buncher being adapted for rocking movement for permitting the first mentioned fingers to assume an upstanding position for arresting rearward movement of a crop and said buncher being rockable downwardly for actuating the trip finger and shifting the first mentioned fingers downwardly for releasing the crop.

4. An attachment for mowers having a pan and comprising a rockable buncher, a rock shaft mounted on the pan of the mower forwardly of the buncher, said rock shaft having spaced fingers and a trip finger, and a spring carried by the mower at its forward end portion and connected to said rock shaft and adapted for rocking the first mentioned fingers to upstanding position for arresting the movement of a crop moving from the pan, said buncher being adapted for engaging the trip finger and rocking the first mentioned fingers downwardly for releasing the crop for entry to the buncher.

5. An attachment for mowers having a pan and comprising a transverse rockable buncher, a transverse rock shaft carried on said pan at its rear edge portion and having normally upstanding fingers for arresting movement of a crop moving from the pan toward the buncher, and a trip finger carried by the rock shaft at one end thereof, said trip finger being engageable by the buncher for rocking the first mentioned fingers downwardly and permitting discharge of the load from the pan onto the buncher.

JAMES A. DRYDEN.